United States Patent [19]

Gregg et al.

[11] 4,100,306

[45] Jul. 11, 1978

[54] METHOD OF MAKING AN IMPROVED INSTANT COFFEE

[75] Inventors: Richard Gregg, Greenhills; James A. Weikel, Forest Park; Jayantilal M. Patel, Fairfield; Richard F. Durchholz, Loveland, all of Ohio

[73] Assignee: The Procter & Gamble Company, Cincinnati, Ohio

[21] Appl. No.: 655,607

[22] Filed: Feb. 5, 1976

[51] Int. Cl.² .............................................. A23F 1/08
[52] U.S. Cl. ..................................... 426/386; 426/432
[58] Field of Search ................ 426/386, 387, 432, 434

[56] References Cited

U.S. PATENT DOCUMENTS

| | | | |
|---|---|---|---|
| 3,035,922 | 5/1962 | Mook et al. | 426/387 |
| 3,244,532 | 4/1966 | Mahlmann | 426/511 X |
| 3,261,689 | 7/1966 | Ponzoni | 426/432 X |
| 3,529,968 | 9/1970 | Hair et al. | 426/434 |
| 3,532,507 | 10/1970 | Cascione | 426/385 |
| 3,655,399 | 4/1972 | Pitchon et al. | 426/434 X |
| 3,656,315 | 4/1972 | Ganiaris | 426/385 X |
| 3,809,770 | 5/1974 | Jolly et al. | 426/594 |

FOREIGN PATENT DOCUMENTS

| | | | |
|---|---|---|---|
| 563,792 | 7/1975 | Switzerland | 426/386 |
| 246,454 | 10/1926 | United Kingdom | 426/386 |

OTHER PUBLICATIONS

"Coffee Processing Technology," by M. Sivetz, vol. 2, published by Avi Pub. Co., Westport, Conn., 1963, pp. 19–20.

*Primary Examiner*—Robert Halper
*Attorney, Agent, or Firm*—Leonard Williamson

[57] ABSTRACT

An improved instant coffee is prepared by subjecting roast and finely ground coffee particles of 5–800 microns to devolatilization and extraction operations under conditions which sustain the freshness of a desirable coffee volatiles and soluble solids. A semi-bed of mechanically fluidized roasted and ground coffee particles is sprayed with 32°–110° F water and contacted with steam for devolatilization under an absolute pressure of 5–100 mm of Hg and a temperature of 32°–110° F. The resulting volatiles-laden steam is then condensed under an absolute pressure of about 4–80 mm of Hg and under supercooling conditions to provide a frost. A coffee volatiles-containing concentrate is made from that frost by contacting it with an aqueous coffee extract. Valuable coffee solids remaining in the devolatilized roast and fine ground coffee particles are extracted therefrom by a slurry extraction operation. Gentle agitation is employed to negotiate the extraction of soluble coffee solids without the release and emulsification of bitter coffee oils. The extract is separated from slurry insolubles. This extract and the coffee-volatiles concentrate provide the components of an improved instant coffee.

14 Claims, No Drawings

METHOD OF MAKING AN IMPROVED INSTANT COFFEE

BACKGROUND OF THE INVENTION

This invention relates to a process for preparing a coffee product. More particularly, it relates to a process for preparing a coffee product of the soluble or "instant" type.

Many methods have been described for the production of coffee products of the soluble type. For the most part, these methods have been aimed toward the provision of coffee products capable of duplicating the desired flavor qualities of freshly perked roast and ground coffee. Illustrative of such methods are those described in U.S. Pat. Nos. Clinton et al., 3,244,531, 3,903,312, Sept. 2, 1975; Strobel, 3,717,472, Feb. 1973; Cascione, 3,532,507, Oct. 1970; Mook et al., 3,035,922, May 1962; Mahlmann, 3,244,532, Apr. 1966; and Pitchon et al., 3,653,910 and 3,655,399, Apr. 4 and 11, 1972.

Freshly brewed or perked vacuum roast and ground coffee has tended to be the standard against which soluble coffee products have been judged and efforts have, thus, been principally directed toward duplicating in soluble products the flavor qualities of freshly brewed vacuum roast and ground coffee.

While prior methods have been directed toward soluble coffee products having the flavor attributes of freshly brewed roast and ground coffee, such methods have not been entirely successful. Various deficiencies have been recognized by those users who customarily prefer freshly brewed coffee flavor and the presence of additional flavor characteristics not customarily found in freshly brewed coffee have also been noted. Moreover, prior attempts do not appear to have provided soluble coffee products having flavor characteristics preferred over those of freshly brewed roast and ground coffee among users/drinkers of vacuum roast and ground coffee.

It is an object of the present invention to provide a process for preparing a soluble coffee product having flavor qualities preferred over those of freshly brewed roast and ground coffee by users/drinkers of vacuum roast and ground coffee.

It is an object of the present invention to provide a method or process to make an improved instant coffee.

It is another object of the present invention to provide a gentle but thorough steam distillation operation to recover coffee volatiles.

It is another object of the present invention to provide a high quality concentrate of coffee volatiles.

It is another object of the present invention to provide a practical and effective slurry extraction operation to recover soluble solids from devolatilized roast and ground coffee.

Another object of the present invention is to provide a slurry extraction operation which will keep the slurry components readily separable and emulsion-free.

It is another object of the present invention to provide a process for preparing a soluble coffee product having flavor qualities recognizably different from those of freshly brewed coffee but preferred thereover by vacuum coffee drinkers.

These and other objects and advantages of the present invention will become apparent from the detailed description provided hereinafter.

SUMMARY OF THE INVENTION

It has been discovered that a soluble coffee product having favorable physical characteristics and the preferred flavor attributes of freshly brewed roast and ground coffee can be made, without the undesirable characteristics and bitter flavors that may tend to detract from the acceptability of fresh brewed coffee itself.

It has been discovered that the combination of the present devolatilization and slurry extraction operations will permit the production of a soluble coffee product having flavor attributes preferred over fresh brewed roast and ground coffee by those users who customarily prefer that product. In its essential aspects, the process of the present invention comprises: (a) uniformly wetting finely ground roasted coffee particles (while they are in a state of mechanical fluidization) with from about 0.1–0.9 parts water per part of coffee; (b) contacting the mechanically fluidized coffee particles with about 0.005–0.05 parts steam to provide volatiles-laden steam, and devolatilized roast and ground coffee, said contact being made under an absolute pressure of about 5–100 mm of mercury for about 0.1 to about 45 minutes and at a temperature of about 32°–110° F; (c) collecting the volatiles-laden steam as a frost by condensation at temperatures of from −100° F to −320° F and an absolute pressure of about 4 to 80 mm of mercury; (d) melting the frost to form a volatiles-laden extract by contacting said frost with at least an equal weight of an aqueous coffee extract having 25%–65% solids; (e) slurry extracting the devolatilized coffee with about 2 to 10 parts of water per part of roast and ground coffee on a dry weight basis, using gentle agitation to maintain an emulsion-free liquid fraction while extracting therefrom about 4%–15% coffee solubles; separating the aqueous coffee extract; and (f) drying the extracts of steps (d) and (e) to dry and soluble coffee powders.

DETAILED DESCRIPTION OF THE INVENTION

The key in the process of this invention is subjecting roast and ground coffee to a unique combination of processing conditions for devolatilization and slurry extraction.

A blend of roasted coffee is first ground to a desired particle size ranging from about 5 to about 800 microns. This grind size is critical for the gentle slurry extraction operation of the present invention and, thus, for the success of the production of the improved instant coffee. Gentle agitation is required to avoid the release of coffee oils from the finely ground coffee and emulsification of the oils in the coffee extract.

The gentle agitation also keeps the components in the slurry itself readily separable by avoiding the formation of emulsions or gels on filter media which hamper the separation of the coffee extract from the slurry insolubles by plugging up the filter media pores.

In general, coarse grinds tend to require excessive agitation and elevated temperatures to obtain practical yields of coffee solubles and consequently desired flavor characteristics are impaired. It has been found that the release of bitter-tasting coffee oils increases with the fineness of grind, increased agitation and higher temperatures. The process of the invention makes use of finely ground roast and ground coffee extracted under relatively mild extractive temperatures with gentle agitation. The fineness of coffee grind size, 5 to 800 microns, while not critical to the devolatilization step, is critical to the slurry extraction step because the fine coffee particles can be suspended and extracted in practical yield under the gentle agitation conditions which avoid emulsification of bitter oils. The fineness also increases extraction yields because of increased contact with the slurry water. It also improves the quality of extract because the fineness permits the use of lower temperatures, 80° to 200° F.

An ultra-fine grind size of from about 10 to about 400 microns is preferred. A preferred way to get this grind size is by embrittlement of the roasted coffee beans with liquid nitrogen or liquid $CO_2$ and then grinding the cold embrittled beans in a coffee grinder. A grinder suitable for this operation is the Fitz ® Mill Model U Granulator, manufactured by the Fitzpatrick Co., Elmhurst, Ill. 60126.

It will be noted that ultra-fine grinding of coffee is accomplished in this fashion without reaching temperatures that tend to degrade or drive off essential coffee volatiles; thus, enhancing the quality of the final coffee product. Preferably, the roast and ground coffee is ground at a temperature of about −110° F to about −320° F.

After the blend of coffee beans are roasted and ground, it is subjected to a steam-stripping or devolatilization operation carried out at temperatures between 32°–110° F and an absolute pressure in the range of 5–100 mm of mercury so that the volatiles might be removed without degrading the coffee flavors and aromas in the volatiles as well as those in the soluble coffee solids.

One aspect of the steam-stripping operation is the uniform wetting of the roast and ground coffee particles, preferably while they are in a state of mechanical fluidization. About 0.1 to about 0.9 part of water per part of roast and ground coffee is required to facilitate the release of the volatiles at the moderate operating temperatures. The wetting water temperature range is 32°–110° F. Again, the control of temperature is critical to avoid degrading the coffee flavors and aromas. In a batch operation, the coffee is wet as above and then contacted with from about 0.005 to about 0.05 part of steam per part of roast and ground coffee. In a continuous operation, the wetting and the contacting with steam are preferably simultaneous operations. After contacting the mechanically fluidized roast and ground coffee as described above, the volatiles are released in the form of volatilesladen steam. The contact time for devolatilization is from about 0.1 to about 45 minutes, preferably from 0.5 to 10 minutes. Fluidization while steam stripping, time, temperature and pressure, as described herein, are critical and maximize the speedy removal of fresh coffee volatiles by avoiding the less favorable conditions which have been found to degrade these volatiles as well as the soluble coffee solids remaining in the devolatilized coffee grounds.

The mechanical fluidization of the coffee particles during the steam-stripping or devolatilization step is very important because it provides uniform steam-stripping by allowing intimate contact. Another reason why mechanical fluidization is important in the present invention is that it allows the steam-stripping operation to be conducted at lower temperatures and vacuum pressures without excessive pressure drops across the coffee bed. As used herein, the term semibed of coffee denotes a state of partial mechanical fluidization of coffee whereby some of the coffee particles are momentarily on the bottom of the coffee bed while the other particles are mechanically fluidized.

The volatiles-laden steam which is generated by the devolatilization or steam-stripping step is drawn from the vessel or chamber in which the operation is performed and collected in a condenser in the form of a frost. The condenser must be maintained at a temperature of from about −100° F to about 320° F and an absolute pressure of from about 4 to about 80 mm of mercury. Like the steam-stripping operation itself, these conditions are critical to achieve the quality of volatiles desired. Condensation of the volatiles-laden steam at higher temperatures and pressures result in unsatisfactory products which fall short of the flavor objectives of the present invention.

The next step is the melting of the frost to form a coffee volatiles concentrate. This is conducted by contacting the frost with an aqueous coffee extract of at least an equal amount of weight and having a solids content of from about 25% to about 65% soluble solids. The weight ratio of said aqueous coffee extract to said frost is preferable from about 1:1 to about 10:1, but larger amounts of extract can be used. The percentage of soluble solids in said aqueous coffee extract is preferably 27% to 50%. The aqueous coffee extract is preferably one made by a slurry extraction operation described herein, but other coffee extracts may be used for melting and preserving maximum volatile freshness. It is critical that the melting of the frost is accomplished in this fashion for it has been found that if the frost is allowed to melt by itself at room temperature or below, an unsatisfactory product results.

The coffee volatiles concentrate resulting from the melt is further concentrated and dried and preferably freezeconcentrated and freeze-dried. Alternatively, the coffee volatiles concentrate is mixed with more aqueous coffee extract and then freeze-concentrated or evaporation-concentrated and then freeze-dried or spray-dried.

The soluble coffee solids remaining in the devolatilized coffee are extracted by a slurry extraction operation. It has been found that the flavors or taste of those soluble coffee solids are still fresh after the steam-stripping (devolatilization) operation of the present invention.

The slurry extraction operation is performed after the roast and ground coffee particles have been wetted and subjected to the devolatilization or steam-stripping operation. An aqueous slurry comprising the devolatilized roast and ground coffee and from about 2 parts to about 10 parts of water by weight of the dry coffee is prepared. The slurry extraction is conducted at a temperature of from about 80° F to about 200° F for about 3 to about 120 minutes. Preferably, the slurry is heated by steam injections.

Preferably, the residence time of the coffee in the slurry operation is about 15 to 30 minutes; especially when the temperature of the slurry is about 90° F to about 160° F. If coarser coffee particles of about 800 microns are used, more time is required. The higher temperatures (160°–200° F) can also be utilized to achieve the desired yields. Whatever the conditions are within the limitations set out herein for the present slurry extraction operation, care must be taken to minimize the release of bitter-tasting coffee oil and the formation of emulsions while obtaining the aqueous coffee extract. When separated from the slurry insolubles, the aqueous coffee extract has a solids content of from about 4% to about 15%. It has been found that attempts to get yields greater than about 15% seriously compromise the quality of soluble coffee solids desired. The range of 4% to 15% represents an extraction yield of about 18% to about 27% based upon the dry weight of the coffee charge.

It has been found that excessive agitation will cause the release of excessive amounts of coffee oils from the ultrafine ground coffee particles and that the oil will become emulsified. Emulsions in the slurry or extract cause separation problems, e.g., by plugging the filter media. The formation of these emulsions must be avoided. Accordingly, gentle agitation is employed, and as used herein, gentle agitation refers to agitation sufficiently high as to permit the formation of a substantially uniform slurry of coffee particles and the extraction of coffee solubles therefrom but sufficiently low as to provide an extract substantially free of emulsified coffee oils.

The agitation system used in the present invention for the slurry extraction operation can be characterized as a low shear system. An example of such a system is illustrated by a slurry tank capable of holding about 150 lbs. of slurry and which is agitated by a slow-moving (5-25 rpm) large leafshaped paddle. The paddle is contoured to the vertical shape of the slurry extraction tank which has a 1.5-foot diameter. The paddle clears the shell of the tank by about 1 to 2 centimeters. The speed, number of revolutions per minute, of the paddle is preferably kept to a minimum, that is, a number high enough to maintain a substantially uniform suspension of the coffee particles but low enough as not to cause the formation of emulsions in the slurry.

The aqueous extract is separated from the slurry insolubles by any appropriate method such as decantation, filtration or centrifugation. However, a method of separation should be chosen to assure that the separated coffee extract contains little or no oil, i.e., no more than about 0.0008 parts of oil per part of soluble coffee solids, and preferably less than about 0.004 parts of oil per part of soluble coffee solids. A preferred method of separation is vacuum filtration. It has been found that most of the released coffee oil is trapped in the filter cake of coffee grounds formed on the vacuum filter media. The cake of coffee grounds can be washed with water to recover residual coffee solids. This wash water can be either recycled as slurry water or added to the coffee extract (filtrate). The filtrate, an aqueous coffee extract, has from about 4% to about 15% coffee solids. It can be freeze-dried or spray-dried. Of course, the aqueous coffee extract is concentrated by conventional freeze concentration or evaporation techniques prior to drying.

Time, temperature, level of agitation and coffee-to-water ratio selected for the slurry extraction operation will depend to a large extent upon the grind size of the coffee particles treated. It has been found that the required time, heat or agitation level will generally increase with the grind size.

In the preferred process of the present invention, a slurry of devolatilized roast and ground coffee and water is fed into a continuous slurry tank and uniformly suspended therein. There is uniformity of slurry composition with time and/or temperature. (Uniform as used herein means substantially uniform.) A steady state of conditions are maintained so that the properties throughout the system do not vary with time. The slurry flows continuously into the slurry extraction tank and the extract flows continuously out.

It has been found in the practice of the present invention, that the water-coffee ratio in the slurry extraction process is preferably from about 2:1 to about 5:1 parts by weight of said coffee and most preferably from about 2.25:1 to about 3.0:1 parts by weight of the said coffee.

An improved soluble or instant coffee composition is obtained by combining the dried powders obtained by drying the coffee volatiles concentrate and slurry extract portions as described herein. Preferably, the coffee volatiles concentrate and extract portions will be individually dried and the respective powders will be simply combined, although co-drying of both portions can be employed.

The instant coffee product produced by the process of the present invention is found to have a superior flavor, a flavor that is different from, but preferred over, the flavor of a fresh brew of an identical coffee blend of vacuum coffee by large panels of fresh brew vacuum coffee drinkers/users.

The process of this invention will be further understood by reference to the following Examples:

EXAMPLE 1

Six hundred pounds of a blend of green coffee beans were roasted in a Thermolo Roaster ® for 17.3 minutes at a maximum temperature of 420° F. The roasted coffee had a photovolt color of 72. The roaster was first preheated to 400° F and the beans added thereto.

About 500 pounds of this roasted coffee were cooled to embrittlement with liquid nitrogen and cold fine ground at a temperature of about −310° F with a hammermill grinder to a particle size ranging from about 10 to about 75 microns. The grinder used in this operation was a Fitz Mill Model U Granulator/Comminutor, manufactured by the Fitzpatrick Co., Elmhurst, Ill. 60126 and described in its Bulletin No. 202. A 33 mil screen and DS-675 blades were used, both of which are Fitz Mill products. The ground coffee was held overnight in a cold room at −40° F.

DEVOLATILIZATION STEP

The next day, these roast and ground coffee particles were fed into a mechanically fluidized bed (provided by a 10.3 cubic foot continuous Littleford Mixer, Model KM 300D, manufactured by the Littleford Bros., Inc., Cincinnati, Ohio) at a flow rate of 80 pounds per hour.

Plow-shaped mixing tools rotating at high speeds inside the horizontal mixing shell imparted rapid but gentle motion to the coffee particles, turning them into a turbulent fluidized state. The plows were designed to lift the materials from the drum walls so that rapid mixing takes place without adverse effect on the fragile coffee particles.

Being fluidized, the coffee particles were uniformly wet. About 0.132 parts water per part of the coffee. The temperature of the water was about 65° F. The water was dispersed into the mixing chamber (drum) of the mixer by spraying water on choppers to obtain uniform wetting. Independently driven rotating choppers arranged between the paths of the plows atomized the water as well as broke up agglomerates or lumps which existed in the coffee bed that may have formed during the operation. The water was sprayed on the coffee particles in the mixing chamber at a flow rate of about 10.5 pounds per hour.

A stream of cool steam was introduced into the chamber counter-current to the flow of the wet fluidized coffee particles. The steam was introduced at a flow rate of about 2.3 pounds per hour. When the steam entered the vacuum chamber its temperature fell to about 71° F. Inside the mixing chamber was held under an absolute pressure of about 27 mm of mercury. The fluidized bed temperature was about 71° F. These conditions were maintained throughout the operation with little variation. The steam made intimate contact with the fluidized coffee particles for an estimated time of 1.2 minutes and thereby stripped them of their volatiles. The products of this operation were volatiles-laden steam and wet devolatilized coffee.

The volatiles-laden steam passed out of the mixing chamber through a gravity solids separator to remove any carryover of roast and ground coffee particles, and then collected and condensed on the walls of a four-liter glass vacuum flask in the form of a frost. The vacuum flask was held under an absolute pressure of about 15 mm of mercury and at a temperature of about −320° F with a liquid nitrogen jacket and a vacuum pump.

About 3.5 pounds of the volatiles-laden frost were recovered and the frost was melted by contacting it with about 31.6 pounds of a 30% solids, aqueous coffee extract.

This coffee volatiles concentrate was vacuum freeze-dried and yielded 6.6 pounds of a substantially dry volatiles-laden coffee powder which was later mixed with a dry coffee extract (described below) to yield a final instant coffee product.

SLURRY EXTRACTION STEP

The devolatilized coffee particles were conveyed out of the mixing chamber (of the Littleford Mixer) and mixed with an average of about 2.3 pounds of water per pound of coffee on a dry coffee weight basis. The resulting slurry was fed into a slurry extraction tank at a flow rate of about 264 pounds per hour. As the slurry was being pumped into the slurry extraction tank, it was heated to 110° F by steam injection.

The slurry extraction tank used in this example was a 1.5 diameter stainless steel jacketed cone bottom slurry tank equipped with a large cone tipped leaf paddle contoured to the cone bottom and shape of the slurry extracting tank and cleared the tank shell by about 1 centimeter. The large leaf shaped paddle provided thorough low speed (15 rpms) gentle agitation for the slurry extraction operation.

The gentle action of the leaf shaped paddle produced a substantially uniform suspension of finely ground coffee particles which extracted the coffee solubles without releasing an excessive amount of bitter tasting coffee oils from the coffee particles. No emulsions or oil gels were observed in the slurry itself on the filter media described below.

The volume of the slurry extraction tank was held constant by regulation of the slurry feed and output rates and the rates were such as to provide a residence time for the average roast and ground coffee particle of about 20 minutes.

The slurry output was fed onto a rotating 10.5 sq. ft. horizontal vacuum filter belt called the EIMCO-Extractor, manufactured by EIMCO, a subsidiary of the Ogden Corporation, Salt Lake City, Utah 84110. The feed flowed by gravity and was spread rapidly over the filtration deck by a full width arrangement.

The filtration deck consisted of a synthetic filter media, No. 859, and a traveling drainage belt. Vacuum was applied continuously through ports in the deck.

As the feed dispersed over the media, the combined forces of gravity and vacuum affected an almost immediate separation of the aqueous coffee extract from the feed and the coffee ground cake formed rapidly. It was observed that some coffee oil released during the slurry extraction operation was retained on the filter media and in the coffee ground cake. No emulsion was observed. It is estimated that less than 0.004 parts of oil per part of soluble coffee solids passed into the separated aqueous extract. The aqueous extract was drawn off through vacuum ports to a holding tank.

The cake of coffee grounds were washed thoroughly to remove residual coffee solubles and traveled to discharge. The wash water was recycled to holding tank as slurry water and mixed with fresh devolatilized coffee. As the cake of coffee grounds rolled over a small diameter discharge roller the abrupt change in axis broke the cake loose and it fell away from the media. The media was washed clean before receiving fresh feed and this wash discharged.

About 775 pounds of extract was collected, having a solids concentration of about 12.7 percent and an extraction yield of 98.75 pounds of solubles, about 19.75 percent based on the weight of the dry roast and ground coffee charge. The aqueous extract was freeze-concentrated to about 39% solids and vacuum freeze-dried into a soluble extract coffee powder. The volatiles-laden coffee powder of this example was blended with this extract coffee powder at an add-back level of about 19.2 percent to provide an excellent instant coffee.

When the blend of powders was diluted to beverage strength, cup color was very clear. Flavor and taste were superior to that obtained from a fresh brew of vacuum coffee as judged by large panels of fresh brewed vacuum coffee users.

EXAMPLE II

Another product was obtained by the procedure set out in Example I except that the aqueous extract was freeze-concentrated and spray-dried.

The instant coffee product of this example was comparable to the flavor and taste of the product of Example I.

EXAMPLE III

The same as Example II except that the aqueous extract was concentrated by evaporation instead of freeze-concentration and the product of this example was comparable to those of Examples I and II in clarity, taste and flavor.

When diluted to beverage strength, cup color was very clear and the flavor and taste superior to that obtained from a fresh brew of vacuum coffee as judged by large panels of fresh brewed vacuum coffee users.

What is claimed is:

1. A method for preparing a soluble instant coffee composition from roast and ground coffee comprising the steps of:
    (a) uniformly wetting a semi-bed of roast and ground coffee while the coffee is in a state of mechanical fluidization, with from about 0.1 to about 0.9 parts water per part of roast and ground coffee, said water being at a temperature of from about 32° F. to about 110° F., said roast and ground coffee having a particle size of from about 5 to about 800 microns;
    (b) contacting the mechanically fluidized roast and ground coffee with from about 0.005 to about 0.05 parts steam, per part of roast and ground coffee, thereby to provide volatiles-laden steam and devolatilized roast and ground coffee, said contact being conducted under an absolute pressure of from about 5 to about 100 mm of mercury, the steam having a temperature of from about 32° F. to about 110° F., said roast and ground coffee making contact with said steam for about 0.1 to about 45 minutes;

(c) collecting the volatiles-laden steam as a frost by condensation at a temperature of from about −100° F. to about −320° F. and at an absolute pressure of from about 4 to about 80 mm of mercury;

(d) melting the frost to form a volatiles-laden extract by contacting the frost with at least an equal weight of an aqueous coffee extract having a solids content of from about 25% to about 65%;

(e) forming an aqueous slurry of the devolatilized roast and ground coffee and from about 2 parts to about 10 parts of water by dry weight of coffee, said slurry having a temperature of from about 80° F. to about 200° F., and gently agitating the slurry with a low shear agitation system so as to provide a substantially uniform suspension and an extract having a soluble coffee solids content of about 4% to about 15%, and wherein said soluble coffee solids are about 18% to about 27% of said roast and ground coffee on a dry weight basis, said low shear agitation system maintaining a substantially emulsion-free slurry, separating the aqueous extract from released coffee oil and extracted coffee grounds; and (f) drying the aqueous extracts of steps (d) and (e) to dry and soluble coffee powders; and (g) combining said powders to provide said instant coffee composition.

2. The method of claim 1 wherein said roast and ground coffee was ground at a temperature of about −110° F to about −320° F.

3. The method of claim 1 wherein said devolatilized roast and ground coffee has a slurry extraction residence time of about 3 to about 120 minutes.

4. The method of claim 1 wherein said method is a continuous process.

5. The method of claim 4 wherein said roast and ground coffee has an average particle size of from about 10 to about 400 microns.

6. The method of claim 4 wherein said roast and ground coffee is in contact with said steam for about 0.5 to about 10 minutes.

7. The method of claim 4 wherein the temperature of said slurry is between 90° F and 160° F, and said roast and ground coffee has a slurry extraction residence time of about 15 to 30 minutes.

8. The method of claim 4 wherein said slurry has a water:coffee ratio of from about 2:1 to about 5:1 parts by weight.

9. The method of claim 8 wherein said coffee:water ratio is from about 2.25:1 to 3.0:1.

10. The method of claim 1 wherein said aqueous coffee extract is freeze-concentrated and then freeze-dried.

11. The method of claim 1 wherein said aqueous coffee extract is concentrated by evaporation and then freeze-dried.

12. The method of claim 1 wherein said volatiles are recovered by melting said frost by contacting the frost with a 27% to 50% solids aqueous extract wherein the weight ratio of this extract to said frost is from about 1:1 to about 10:1.

13. The method of claim 1 wherein said aqueous coffee extract is concentrated by evaporation and then spray-dried.

14. The method of claim 1 wherein said separated aqueous extract has a coffee oil content of less than 0.004 parts per part of soluble solids.

* * * * *